United States Patent [19]
Haruta et al.

[11] Patent Number: 4,686,682
[45] Date of Patent: Aug. 11, 1987

[54] DISCHARGE EXCITATION TYPE SHORT PULSE LASER DEVICE

[75] Inventors: Kenyu Haruta, Mino; Hitoshi Wakata, Itami; Yukio Sato, Amagasaki; Haruhiko Nagai; Hajime Nakatani, both of Hyogo; Hideki Kita, Toyonaka, all of Japan

[73] Assignee: Mitsubishi Denki Kabushiki Kaisha, Tokyo, Japan

[21] Appl. No.: 782,568

[22] Filed: Oct. 1, 1985

[30] Foreign Application Priority Data

| Oct. 9, 1984 | [JP] | Japan | 59-212843 |
|---|---|---|---|
| Oct. 11, 1984 | [JP] | Japan | 59-213633 |
| Oct. 11, 1984 | [JP] | Japan | 59-213629 |
| Nov. 12, 1984 | [JP] | Japan | 59-240181 |
| Nov. 13, 1984 | [JP] | Japan | 59-239268 |
| Feb. 18, 1985 | [JP] | Japan | 60-29791 |
| Feb. 18, 1985 | [JP] | Japan | 60-29793 |
| Feb. 18, 1985 | [JP] | Japan | 60-29794 |
| Mar. 28, 1985 | [JP] | Japan | 60-67516 |

[51] Int. Cl.$^4$ ............................................. H01S 3/097
[52] U.S. Cl. ................................... 372/87; 372/83
[58] Field of Search ........................... 372/87, 83, 81

[56] References Cited

U.S. PATENT DOCUMENTS 3,662,284  5/1972  Beaulieu et al. ................. 372/87

FOREIGN PATENT DOCUMENTS 53-40878  10/1978  Japan.

Primary Examiner—Gene Wan
Attorney, Agent, or Firm—Oblon, Fisher, Spivak, McClelland & Maier

[57] ABSTRACT

A discharge excitation type short pulse laser device which is constructed with first and second main electrodes disposed in confrontation with the direction of the laser beam axis as their longitudinal direction, an auxiliary electrode provided on the rear surface part of the second main electrode and opposed to the second main electrode through the dielectric member, a pulse circuit for applying a pulse voltage across the first and second main electrodes, and a circuit for applying a voltage across the auxiliary electrode and the second main electrode, the circuit forming a part of the pulse circuit, or being independent of the pulse circuit, wherein the second main electrode is made of an electrically conductive material having a plurality of apertures therein, the second main electrode and the dielectric member are disposed in tight adhesion each other, and the second main electrode is thinly formed to enable creeping discharge to be produced on the surface of the dielectric member, thereby distributing electrons to be the seed for the main discharge to be generated across the main electrode.

22 Claims, 37 Drawing Figures

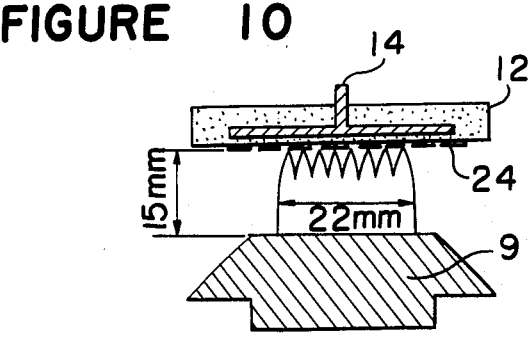
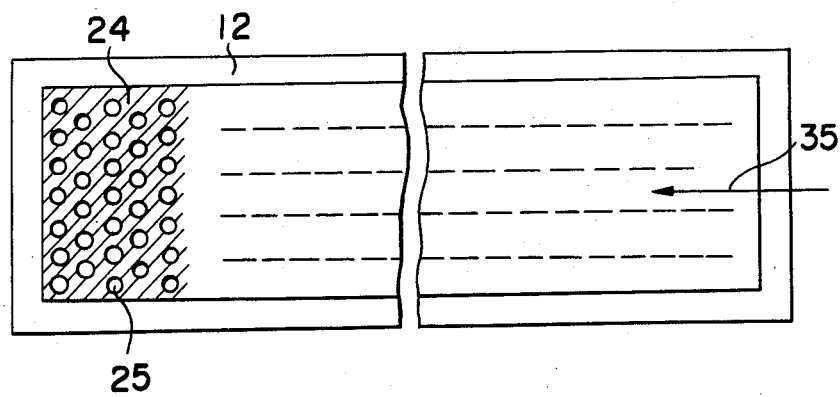
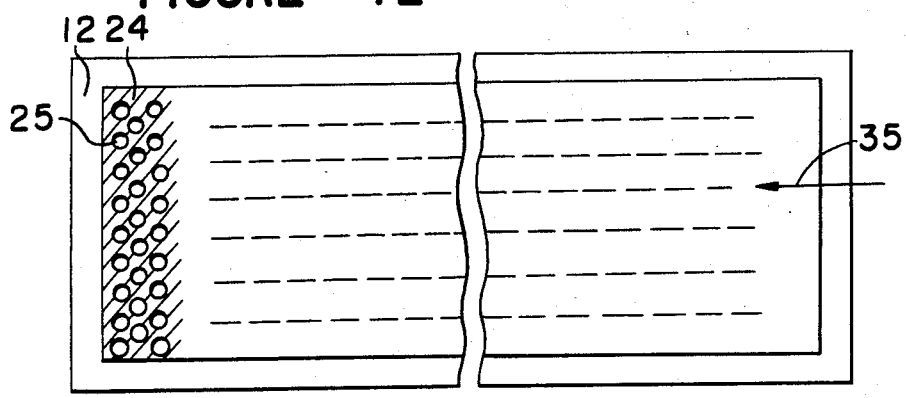

DISCHARGE EXCITATION TYPE SHORT PULSE LASER DEVICE

BACKGROUND OF THE INVENTION

1. Field of the Invention

This invention is directed to a discharge excitation type short pulse laser device out of various laser devices, and, more particularly, it is concerned with construction of its electrode.

2. Discussion of the Background

For obtaining the laser oscillation, it is the requisite condition that a spatially uniform discharge be carried out in a laser medium.

However, in those short pulse lasers such as excimer laser, TEA $CO_2$ laser, and so forth, the discharge tends to form a converged arc, because its operating pressure is as high as several atmospheres. In order to prevent this, it has been a usual practice to effect pre-ionization, in which seeds of electrons are uniformly scattered beforehand in the main discharge region prior to such main discharge.

In the following, explanations will be given as to the conventional techniques in reference to FIGS. 1 to 4 of the accompanying drawing.

FIG. 1 is a cross-sectional view showing a ultra-violet (UV) pre-ionization type excimer laser device as disclosed in, for example, "*ELECTRONICS*", August issue, page 881 (1983), by Sato et al. In the drawing, a reference numeral 1 designates a high tension power source, a numeral 2 refers to a capacitor, a numeral 3 refers to a high resistor, 4 denotes a winding, 5 represents a capacitor, 6a and 6b refer to pre-ionization pins, 7 a gap, 8 a cathode, 9 an anode, 10 a main discharge region, and 11 a switch.

FIG. 2 is a cross-sectional view of a TEA $CO_2$ laser device as disclosed in, for example, J. Lachambre et al., *IEEE Journal of Quantum Electronics:* Vol. QE-9, No. 4, 459p (1973); M. Blanchard et al., *Journal of Applied Physics:* Vol. 45, No. 3, 1311p (1974); and so forth, which is an improvement for removing various disadvantages in the above-described conventional excimer laser device, detailed explanations of which will be given later. It should, however, be understood that, since the circuit system of the laser device shown in FIG. 2 is made identical with that of FIG. 1, its construction differs somewhat from those laser devices disclosed in these technical literature. In the drawing, a reference numeral 12 designates a dielectric member, a numeral 13 refers to a capacitor, a numeral 14 refers to an auxiliary electrode, a numeral 15 denotes a mesh cathode, and 16 a pre-discharge region.

FIG. 3 is a cross-sectional view showing a construction of the electrode section in the TEA $CO_2$ laser device shown, for example, in Y, Pan et al., *The Review of Scientific Instruments:* Vol. 43, No. 4, 662p (1972), which is a modified embodiment of the device shown in FIG. 2 above. In the drawing, a reference numeral 17 designates a Pyrex glass tube, a numeral 18 refers to a lead line, a numeral 19 represents a pre-discharge space, a numeral 20 a power feeding section made of copper, a numeral 21 denotes a supporting table made of a plastic material, and 22 an insulating member.

FIG. 4 is another modified embodiment of the laser device in FIG. 2, in which those component parts same as those in FIGS. 2 and 3 are designated by the same reference numerals.

In the following, the operations of these conventional laser devices will be explained.

In FIG. 1, electric charge supplied from the high tension power source is first accumulated in the capacitor 2. Next, when the switch 11 is brought to its conductive state, the charge accumulated in the capacitor 2 shifts to the capacitor 5 via a current loop starting from the capacitor 2, passing through the switch 11, further passing through the anode 9 and the pre-ionization pins 6b by way of an earth line, and returning to the capacitor 2 by way of the pre-ionization pins 6a, the capacitor 5, and the winding 4. During the shifting of the electric charge, an arc discharge takes place in a very small gap between the pre-ionization pins 6a and 6b, from which arc discharge the ultra-violet rays are generated. With this ultra-violet rays, there takes place photo-ionization in the main discharge region 10 (this photo-ionization will hereinafter be called "ultra-violet ray pre-ionization"), whereby more than $10^4$ to $10^6$ per cubic centimeter of electrons are uniformly supplied in the space of the main discharge region 10 to suppress growth of local streamers and the arc discharge at the time of the main discharge. On the other hand, even during this period, the shifting of the electric change to the capacitor 5 continues, and the voltage across the cathode 8 and the anode 9 is increasing. And, as soon as this voltage reaches the breakdown voltage, there is obtained a spatially uniform pulse discharge in the main discharge region 10 by the effect of the above-mentioned pre-ionization.

Since the operations of the laser device shown in FIG. 2 is the same as those of the device shown in FIG. 1, the operating mechanism of the pre-ionization will be explained hereinbelow. Prior to the switch 11 being brought to the conductive state, there is substantially no potential difference between the mesh cathode 15 and the auxiliary electrode 14. However, as soon as the switch 11 is brought to its conductive state, and the electric charge starts to move from the capacitor 2 to the capacitor 5, a high electric field is generated across the mesh cathode 15 and the auxiliary electrode 14, whereby the discharge takes place in the pre-discharge space 16 through the dielectric member 12, this discharge process being hereinafter called "aerial pre-discharge". The ultra-violet rays to be generated from this discharge is weaker than that from the arc discharge as shown in FIG. 1 above, and the effect of the ultra-violet rays pre-ionization decreases accordingly. In this conventional embodiment, however, a part of the electrons produced in the pre-discharge space 16 rather passes through the mesh cathode 15 and is directly fed to the neighborhood of the mesh cathode 15 in the space of the main discharge region 10, which is considered to become seed electrons for bringing about spatially uniform main discharge.

FIG. 3 is a modified form of FIG. 2, in which the auxiliary electrode as the lead 18 is disposed in the Pyrex glass tube 17 as the dielectric member held on the plastic supporting table 21, and each lead 18 is joined to the feeding section 20 made of copper to maintain it at the equal electric potential. Moreover, the cathode 8 is in such a construction that it has a plurality of projections in order to enable the aerial pre-ionization to occur in the pre-discharge space 19. The operating mechanism is similar to that shown in FIG. 2 above.

FIG. 4 is a schematic diagram showing the dielectric member 12 and the auxiliary electrode 14 in FIG. 2, which have been replaced by the glass tube 14 and the lead 17. The operating mechanism thereof is similar to that of the embodiment shown in FIG. 2.

By the way, in the conventional embodiment shown in FIGS. 2 to 4, the distance between the cathode 8 or the mesh cathode 15 and the glass tube 17 or the dielectric member 12 (this distance being called hereinafter "thickness of the pre-discharge space") gives influence on the electric power to be made to the pre-discharge space 19 or 16, and the thickness per se determines the volume of the pre-discharge space 16 or 19 with the consequence that it constitutes an important factor to decide the number of electrons per unit area considered in terms of a plane parallel with the above-mentioned cathode.

In the embodiment shown in FIG. 2, it is a usual practice to provide the pre-discharge space 16 of a considerably small thickness in comparison with the distance between the cathode 9 and the mesh cathode 15. Though there has so far been no reported cases, in which the influence by this thickness of the pre-discharge space 16 was quantitatively measured, it is apparent that a tendency to be mentioned hereinbelow is present. That is to say, as the thickness of the above-mentioned pre-discharge space 16 becomes small, the starting voltage of the aerial pre-discharge becomes small, with the consequence that the making power to the above-mentioned space 16 becomes small. Accordingly, when the satisfactory pre-ionization effect is to be obtained, it is necessary that the pre-discharge space 16 be given a certain amount of thickness. However, since it is preferable that the ratio of the power to be consumed for the pre-discharge to the power to be used up for the main discharge be kept to the minimum possible extent from the standpoint of the power efficiency for the laser, the thickness of the above-mentioned pre-discharge space should preferably be kept sufficiently short in comparison with a distance between the anode 9 and the mesh cathode 15 (this distance being called hereinafter "main discharge gap length").

In the similar manner, the embodiment shown in FIGS. 3 and 4 are of such construction that the pre-discharge space 19 is provided between the glass tube 17 and the cathode 8 or the mesh cathode 15.

In the following, explanations will be given in further details as to the pre-ionization mechanism of the conventional laser devices shown in FIGS. 2 to 4.

Unlike the conventional embodiment shown in FIG. 1, these heretofore known laser devices feed the seed electrons to bring about the spatially uniform main discharge only in the vicinity of the cathode, not feeding the same uniformly throughout the space for the main discharge region 10. The effectiveness of this system can be explained as follows. That is to say, as has already been reported in, for example, J. I. Levatter et al., "*Journal of Applied Physics:* Vol. 51, No. 1, page 210 (1980)", for suppressing the arc discharge, it is only sufficient that local development of streamers be prevented by the effect of the space charge field. Therefore, when the seed electrons are fed in the vicinity of the cathode, these seed electrons are attracted by the cathode 9 to form an electron avalanche 23; however, overlapping of these electron avalanches 23 sooner or later would remove the local gradation of the space charge field to thereby be able to prevent the streamers from speeding.

It follows therefore that large pre-ionization effect is obtained with as large a number of the seed electrons as possible per unit area considered in terms of a plane parallel with the cathode being fed.

The conventional discharge excitation type short pulse laser device of the above-described construction had various points of problem to be mentioned in the following.

The device shown in FIG. 1 is of such a construction that the pre-ionization is effected by the ultra-violet rays from both sides of the principal electrodes 8 and 9. With this construction, however, there is a limit to the depth of penetration of the ultra-violet rays, which makes it difficult to widen the breadth of the main discharge region 10. For example, with the excimer laser, there could only be taken out a laser beam having a rectangular cross-section of 6 to 8 mm×20 to 25 mm.

The conventional laser device shown in FIG. 2 provides an improved construction contemplated for solving the above-described points of problem, by which it is possible to widen the breadth of the main discharge region 10 owing to effecting the pre-ionization from the back surface of the mesh cathode 15. As has been mentioned in the foregoing, this type of conventional device has, in its ordinary condition, the mesh cathode 15 provided at a certain distance from the dielectric member 12, which is 3 mm according to the example reported by M. Blanchard et al. in *Journal of Applied Physics:* Vol. 45, No. 3, page 1311 (1974). However, even this type of the laser device has the following points of problem (a) and (b)

(a) It is evidently advantageous from the standpoint of the pre-ionization effect that as many number of electrons as possible out of those electrons produced in the space between the mesh cathode 15 and the dielectric member 12 be caused to pass through the mesh cathode 15 and be fed to the main discharge region. Therefore, if the thickness of the pre-ionization space 16 is made as thin as possible, i.e., if the volume of the pre-ionization space 16 is made small, the aerial pre-discharge input density increases, and the number of electrons produced per unit area, when considered in terms of the plane parallel to the mesh cathode 15, will increase, and further a ratio of the produced electrons being scattered by their collision against molecules until they reach the mesh cathode 15, or a ratio of the produced electrons being extinguished by their re-combination with ions, will desirably decrease. However, as has already been explained with reference to the conventional laser devices, it is impossible, in the aerial pre-discharge, to reduce thickness of the pre-ionization space 16 and yet to cause the making power to remain unchanged (or increase).

(b) When the pulse oscillation of the laser is effected at a quick repeating speed, the cathode 15 is heated by collision of ions against the cathode, on account of which radiation of this generated heat becomes an important factor. Since the space between the mesh cathode 15 and the dielectric member 12 is narrow and is in a state of substantially no convection being present in it, there takes place only the heat transfer based on a temperature gradient. Accordingly, both mesh cathode 15 and the dielectric member 12 should advantageously be brought as close a distance as possible, which however inevitably raises the problem of reduction in the making power for the above-mentioned aerial pre-discharge.

Also, in the conventional device shown in FIG. 4, there is similar problems. In the exemplary device shown in FIG. 3, the electrons produced by the aerial pre-discharge is in the form which can be readily fed.

However, there have been various points of problem such that, since it is virtually difficult to maintain the projections in the cathode 8 and the Pyrex glass tube 17 in an accurately parallel arrangement over the entire longitudinal direction of the cathode 8, and to cause the lead 18 to pass straightforward through the center of the Pyrex glass tube 17, there occur irregularities in the lengthwise direction of the cathode 8, i.e., those places where the aerial pre-discharge takes place easily, and those places where such pre-discharge is difficult to take place, or the structure of the cathode per se is complicated to render its manufacturing difficult.

SUMMARY OF THE INVENTION

The present invention has been made on the basis of a concept such that, in a discharge excitation type short pulse laser device wherein the pre-discharge is effected by way of a dielectric member, one factor of thickness of a space for the pre-discharge and another factor of a making power for the pre-discharge, both of which were inseparable in the conventional aerial pre-discharge, have been made independent each other, thereby generating the pre-discharge in the space of a very thin thickness on the surface of the dielectric member. More concretely, it is an object of the present invention to provide a short pulse laser device having a simple ionization structure and being capable of the laser beam of a large diameter with high safety and reliability by generation of a pre-discharge having uniform and high power density on the surface of the dielectric member over its portion corresponding to the main discharge region.

The discharge excitation type short pulse laser device according to the present invention is so constructed that it comprises first and second main electrodes disposed in mutual confrontation, with the direction of the laser beam axis as their longitudinal direction; an auxiliary electrode provided on the rear surface part of said second main electrode and opposed to said second main electrode through the dielectric member; a pulse circuit for applying a pulse voltage across said first and second main electrodes; and a circuit for applying a voltage across and auxiliary electrode and said second main electrode, and circuit forming a part of said pulse circuit, or being independent of said pulse circuit, in which said second main electrode is made of an electrically conductive material having a plurality of apertures therein, the second main electrode and the dielectric member are disposed in tight adhesion each other, and the second main electrode is thinly formed to enable creeping discharge to be produced on the surface of the dielectric member, thereby distributing electrons to be the seed for the main discharge to be generated across the main electrodes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a cross-sectional view showing a state of the main discharge in the discharge excitation type short pulse laser device according to the first embodiment of the present invention, the main part of which is shown in FIG. 6;

FIG. 11 is a schematic plan view showing an apertured electrode according to the fourth embodiment of the present invention;

FIG. 12 is a schematic plan view showing another apertured electrode according to the fifth embodiment of the present invention;

FIG. 15b is an explanatory diagram for the state of the pre-ionization and the main discharge in the electrode section in FIG. 5a;

FIG. 17b is a plan view showing the main part of the modified embodiment in FIG. 17a;

DESCRIPTION OF THE PREFERRED EMBODIMENTS

Figure 1:
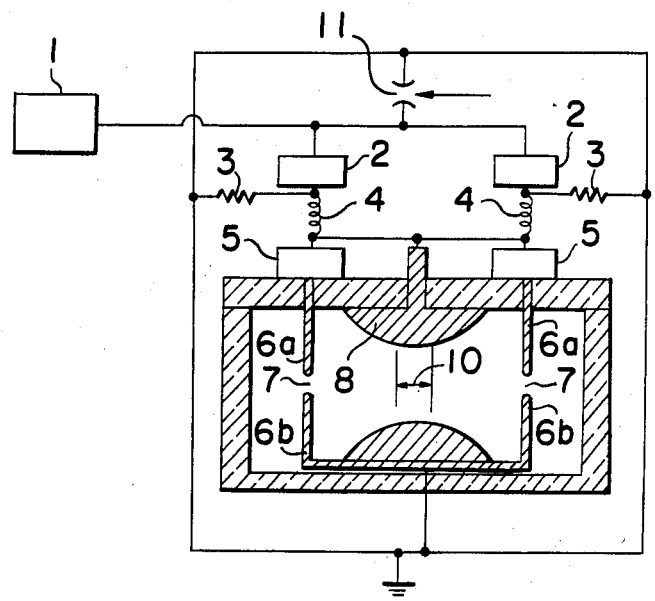
FIGS. 1 and 2 are respectively cross-sectional views showing the conventional discharge excitation type short pulse laser devices.
Figure 2:
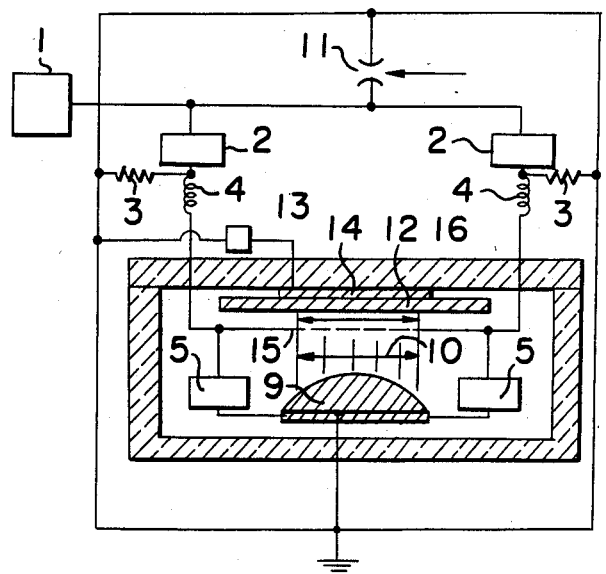
Figure 3:
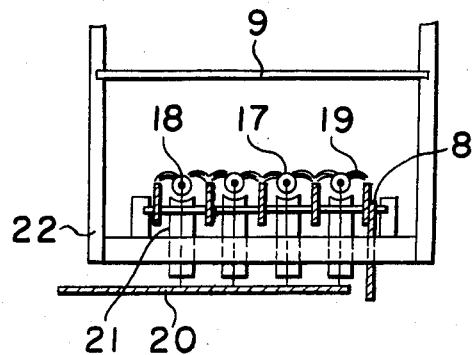
FIGS. 3 and 4 are respectively cross-sectional views showing the main electrode sections of the conventional discharge excitation type short pulse laser devices.
Figure 4:
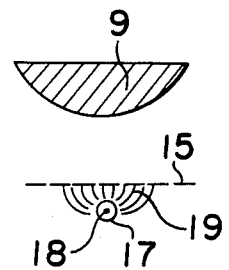
Figure 5:
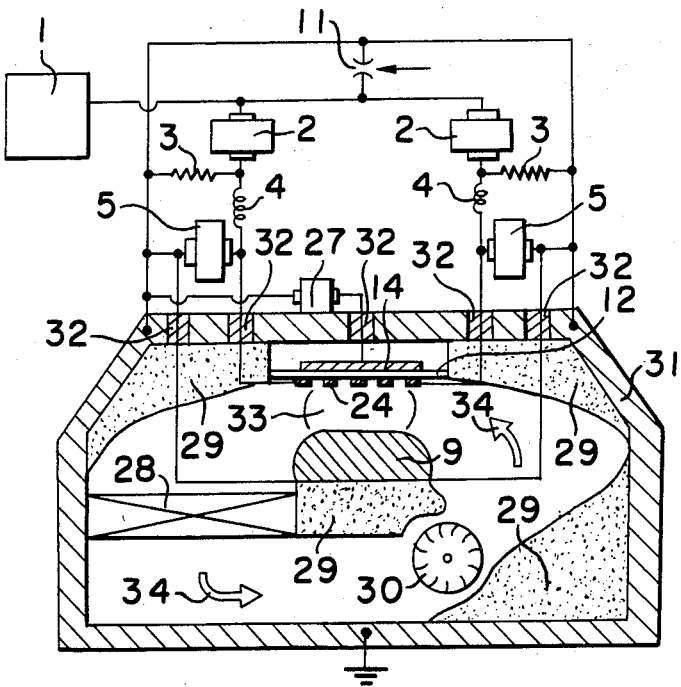
FIG. 5 is a schematic diagram showing the discharge excitation type short pulse laser device according to the present invention.

Various other objects, features and attendant advantages of the present invention will be more fully appreciated as the same becomes better understood from the following detailed description when considered in connection with the accompanying drawings in which like reference characterss designated like or corresponding parts throughout the several views and wherein:

FIG. 5 is a schematic diagram of the discharge excitation type short pulse laser device, to which the present invention is applied. In the drawing, those parts which are idential with those in FIGS. 1 and 2 are designated by the same reference numerals. Also, in the ensuing explanations, the first main electrode is taken as an anode, while the second electrode is taken as a cathode, although the reverse to this is also feasible.

In FIG. 5, a reference numeral 24 designates one of a pair of main electrodes (which will hereinafter be called "apertured electrode"). A numeral 9 refers to an anode as the counterpart main electrode disposed in confrontation to the above-mentioned apertured electrode 24 out of the above-mentioned pair of electrodes. A numeral 14 refers to an auxiliary (or reference) electrode; a reference numeral 12 indicates a dielectric member which is disposed in contiguity to the apertured electrode 24, the auxiliary electrode 14 being disposed on the surface of the dielectric member opposite to the apertured electrode 24 so as to confront to the apertured electrode. A numeral 28 refers to a heat-exchanger; a numeral 29 refers to a fluid guide; and 30 denotes a fan. The above-mentioned electrodes 9, 14, 24, heat-exchanger 28, fluid guide 29, fan 30 and so forth are housed in a laser casing 31. A numeral 32 refers to an insulating member; 33 a main discharge space; and 34 a gas current.

Figure 6A:
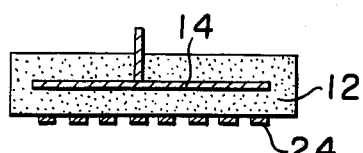
FIGS. 6a and 6b are respectively a cross-sectional view and a schematic plan view showing the cathode section according to the first embodiment of the present invention.
Figure 6B:
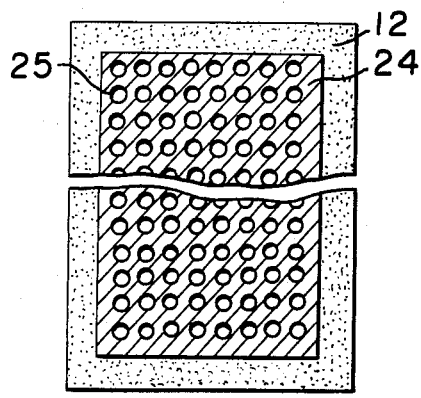

FIGS. 6a and 6b are respectively a cross-sectional view and a plan view showing in detail the second main electrode (or the apertured electrode) according to the first embodiment of the present invention. In the drawing, a numeral 24 refers to an electrically conductive material having a plurality of apertures 25, i.e., the apertured electrode. Both apertured electrode 24 and dielectric member are disposed in close contact each other.

Further, the auxiliary electrode 14 is disposed at the backside of the apertured electrode 24, and, in a manner to be opposite to the apertured electrode 24 through the dielectric member 12. In this illustrated embodiment, the auxiliary electrode 14 is embedded in the interior of the dielectric member 12. In this instance, the backside, or rear surface, of the apertured electrode 24 is meant by its surface opposite to the surface confronting to the anode. By the way, in this embodiment, alumina is used for the dielectric member 12, and the apertured electrode 24 is in the form of an electrically conductive film produced by plating nickel on this dielectric member 12 of alumina to a thickness of 50 $\mu$m. The apertures 25 are formed by etching.

As the circuit system, use was made of the capacitance shifting system as is the case with the conventional laser device shown in FIG. 2. As has been explained with reference to the conventional discharge excitation type short pulse laser device, while the capacitance is shifting between the two capacitors and the voltage across the main electrodes in increasing, a voltage is generated across the apertured electrode 24 and the auxiliary electrode 12, with the consequence that creeping discharge 26 takes place at the apertures 25 of the cathode 24 and on the surface of the dielectric member 12. This creeping discharge 26 occurs in the direction following the surface of the dielectric member 12, a distance of extension of which is determined by a voltage applied to the discharge gap (the voltage having been defined previously as "maintenance voltage", which is different from the voltage applied across the apertured electrode 24 and the auxiliary electrode 14). Accordingly, the maintenance voltage can be increased to such a level that the creeping discharge 26 fills up the apertures 25, and it does not depend on thickness of the apertured electrode 24 (the thickness corresponding substantially to thickness of the creeping discharge 26). As the result of this, the apertured electrode 24 in this embodiment can be made as thin as 20 $\mu$m, and yet sufficient electric power can be made to the pre-discharge (in this case, the creeping discharge). Various conditions for the practice of the creeping discharge are shown in the following Table 1, and the outline of the discharge state is shown in FIG. 10.

TABLE 1

| | |
|---|---|
| Composition of gas: | Xe:HCl:He = 0.15:0.75:99.1 |
| Pressure of gas: | 1 atm. |
| Capacitance of capacitor (2) | 5.4 nF |
| Capacitance of capacitor (5) | 3.8 nF |
| Charge voltage in capacitor (2) | 30 kV |
| Area of apertured cathode (24) | 4 cm × 15 cm |
| Gap length of main discharge | 15 mm |
| Diameter of aperture | 2.4 mm |
| Thickness of apertured cathode | 20 $\mu$m |

In this case, the peak current in the pre-discharge was 1.2 A/cm². As is apparent from the drawing illustration, there could be obtained a clear glow discharge without filameht discharge being mixed in it.

In the reported examples of the conventional discharge excitation type excimer laser, the discharge as obtained had a width of the main discharge region 10 smaller than the gap length of the main discharge. In contrast to this, the width of the main discharge region 10 of 22 mm, which is approximately 1.5 times as large as the gap length (15 mm) in the main discharge could be obtained in the helium buffer, according to this embodiment of the present invention. The effectiveness of the pre-ionization system according to the present invention is thus proved.

Further, since the apertured electrode 24 and the dielectric member 12 are in a closely adhered structure, the heat radiation of the apertured electrode 24 is quicker than that of the conventional device, which contributes to solve the problem in the conventional devices such that arc discharge is generated by irregular gap length for the main discharge which is brought about by slackening and waving in the conventional mesh electrode by red-heating.

Furthermore, the apertured electrode 24 is not only simple in its construction, but also, owing to its structure, it is able to set its thickness with high precision in a unit of micro-meter ($\mu$m), hence the thickness of the creeping pre-discharge 26. In addition to this, it is no longer necessary to take into consideration the spatial arrangement among three elements of the dielectric member and the pair of main electrodes, as is the case with the conventional laser devices, but it is only sufficient that a relative position between either of the dielectric member and the anode or the apertured electrode and the other main electrode be established, which is an advantage of the present invention in manufacturing the laser device.

Figure 7A:
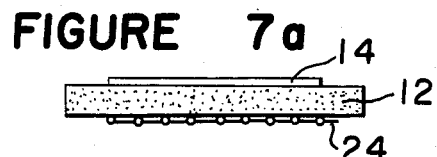
FIGS. 7a and 7b are respectively a cross-sectional view and a schematic plan view showing the cathode section according to the second embodiment of the present invention.
Figure 7B:
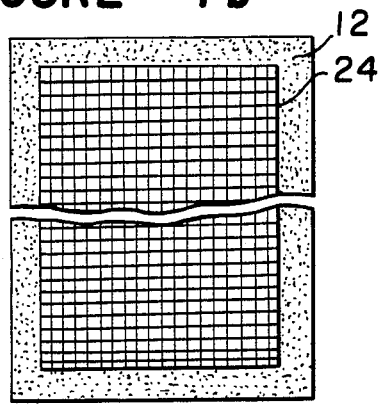

FIGS. 7a and 7b are respectively a cross-sectional view and a plan view showing the cathode section according to the second embodiment of the present invention. The cathode in this embodiment is identical with that as shown in FIGS. 6a and 6b, and exhibits the same resulting effect, with the exception that, as the apertured electrode 24, use was made of a metal mesh having a thickness of from 1 $\mu$m to 3 mm (in this embodiment, it is 100 $\mu$m), and that the auxiliary electrode 14 was tightly adhered to the surface of the dielectric member 12 opposite to the surface where the apertured electrode 24 is tightly adhered.

Figure 8A:
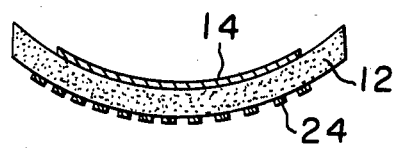
FIG. 8 is a cross-sectional view showing the main electrode section according to the third embodiment of the present invention.
Figure 8B:
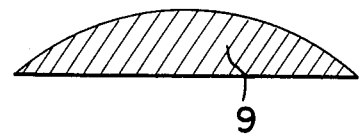
Figure 9A:
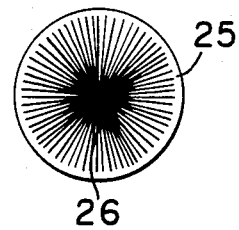
FIGS. 9a and 9b are respectively a plan view and a cross-sectional view showing a state of the creeping discharge.
Figure 9B:
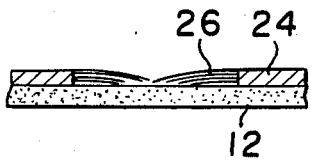

FIG. 8 is a cross-sectional view showing the main electrode section according to the third embodiment of the present invention. In this embodiment, the apertured electrode 24 and the dielectric member 12 are made in a convexed or bulged-out shape toward the anode 9 as represented by, for example, the Rogowski type or the Chang type electrode so as to gradually relax the field intensity in the neighborhood of the surface of the apertured electrode 24 as it is away from the center part of the apertured electrode 24, whereby formation of the arc owing to concentration of the electric field to the end part of the apertured electrode 24 can be prevented.

Incidentally, in the embodiment shown in FIGS. 6a and 6b, the capacitance shifting type circuit construction is used. The present invention, however, is not limited to this type alone, but it can employ any type such as LC-reversed type, bloom-line type, PFN type, and so forth. It may also adopt safely a type wherein the circuit system of the creeping discharge is incorporated in the circuit system of the main discharge, or a type wherein both circuit system are independent one from the other.

Furthermore, FIG. 6 illustrates an example where the apertured electrode 24 is manufactured by plating nickel on alumina base, and then forming the apertures 25 by etching of the nickel-plated alumina base. It should however be noted that the present invention is not limited to this method of manufacture, but any other method may, of course, be adopted safely, such as, for example, adhesion or pressure-adhesion of a punched metal on the dielectric member 12.

Moreover, the material for the dielectric member 12 is not limited to alumina, but various other materials such as, for example, ceramics, glass, etc. may be used. Note should, however, be taken that higher the dielectric constant of the dielectric member 12 will be, and the thinner the thickness thereof will be, the more will increase the making power for the creeping discharge, which is favorable from the operating point of view of the laser device.

In addition, in the above described embodiments, the auxiliary electrode 14 is tightly adhered to the dielectric member 12, although the auxiliary electrode 14 and the dielectric member 12 may be spaced apart one from the other depending on the case. When they are spaced apart, however, there will be a possibility of waste discharge being made across the auxiliary electrode 14 and the dielectric member 12, so that it is preferable that the auxiliary electrode be in tight adhesion with the dielectric member 12 in its use, as in the above-described embodiment. In this case, the auxiliary electrode 14 may also be in such a construction that a dielectric film is formed on the surface thereof.

In the above-described embodiment, the shape of the aperture 25 is made circular of rectangular. It should however be noted that, from the gist of the present invention, the shape of the aperture 25 is in no way limited to these shapes alone.

Also, as the structural factor which affects the creeping discharge 26, there is the aperture diameter of the aperture 25, and, as the structural factor which relates to the power density of the creeping discharge 26, there is the thickness of the apertured electrode. In consideration, however, of the effect of the present invention that the diameter of the aperture 25 (the factor for determining the maximum maintenance voltage) and the thickness of the apertured electrode 24 (the factor for determining thickness of the pre-discharge space) can be set independently of each other so as to impart the optimum pre-ionization effect to the electrodes by use of the creeping discharge 26 as the pre-discharge, the present invention does in no way intend to impose any restriction on these two structural factors. As regards the apertured electrode 24, however, it might be necessary to have a thickness of 1 $\mu$m or above, because, if it is too thin, the electrode is subjected to impact of ions at the time of the main discharge and its service life would be shortened; on the other hand, it should preferably be 3 mm or below, because, if the electrode is too thick, the density of the making power for the creeping discharge 26 becomes low, and such thickness would prevent, the seed electrons to be fed into the main discharge region.

A practical range of thickness of the apertured electrode should preferably be in a range of from 10 $\mu$m to 2 mm.

As mentioned in the foregoing, according to the first to the third embodiments of the present invention, the second main electrode (i.e., apertured electrode) is made of the electrically conductive material and has a plurality of apertures formed therein; moreover, it is so constructed as to distribute the electrons to be the seed for the main discharge to be generated across the main electrodes by arranging the apertured electrode and the dielectric member in close contact each other and by producing the creeping discharge on the surface of the dielectric member, so that the making power of the pre-discharge and the thickness of the pre-discharge space can be dealt with as the separate and independent factors to make it possible to effect the pre-discharge on the surface of the above-mentioned dielectric member with a high density making power, whereby there can be obtained uniform glow discharge over the wide range of the main discharge. As the result of this, there can be exhibited various effects in improvement in the reliability of the laser device such that the laser beam diameter and the laser output can be increased, the structure of the electrode becomes simple, the heat-radiation from the above-mentioned cathode can be done easily, the laser device is durable against quick and repeated laser oscillation, and so forth.

In the following, the fourth embodiment of the present invention will be explained in reference to FIG. 11. In the drawing, the position of the apertures 25 formed in the entire surface of the apertured electrode 24 is so determined that, when arbitrary imaginary lines parallel with the laser beam axis are provided on the surface of the apertured electrode 24 having a plurality of apertures, the imaginary lines may pass through the plurality of apertures 25. For instance, such apertures 25 are arranged in a staggered form.

For example, in the case of the apertured electrode with the apertures being arranged as shown in FIGS. 6a and 6b, there would occur disadvantage to be mentioned in the following. That is to say, for the purpose of observing the state of the main discharge in both main electrodes of the discharge excitation type short pulse laser device from the direction of the laser optical axis, when the laser beam is irradiated onto a photographic film to examine the pattern of the laser beam, there can be observed a dark portion at a place where the laser beam passes through. This indicates that the laser beam itself has irregularity in intensity, which affects the quality of the laser beam. Further, under those conditions where the gas flow rate is short or the laser medium in the main discharge space 33 cannot be sufficiently replaced between one pulse discharge and the subsequent pulse discharge, the laser medium is heated at the portion of the main discharge column, but it is not heated at the dark portion, whereby the temperature distribution in the above-mentioned main discharge space 33 becomes extremely non-uniform. On account of this, unfavorable results would be invited such that the divergent angle of the laser beam considerably increases due to change in its defraction based on difference in density of the gas, or further the subsequent pulse discharge becomes the arc discharge, and other.

Therefore, by arranging the apertures 25 in a staggered form as mentioned above, the discharge columns become overlapped without failure, when viewed from the direction of the laser beam axis, whereby no irregularity in the laser beam intensity will be observed any longer.

In the following, the fifth embodiment of the present invention will be explained in reference to FIG. 12. In this embodiment, the apertures 25 are so arranged that the discharge columns may be overlapped also in the direction perpendicular to the direction of the laser beam axis. In more details, the position of the apertures is so set that, when arbitrary imaginary lines parallel with the laser beam axis and arbitrary imaginary lines orthogonally intersecting with the laser beam axis are provided on the surface of the apertured electrode 24 having a plurality of apertures 25, either of the imaginary lines may pass through the apertures 25.

When the above-mentioned apertures 25 are arranged as shown in FIG. 11, a high quality laser beam can be obtained in the direction 35 of the laser beam, since the discharge columns are overlapped in this direction. However, in the direction orthogonally intersecting with the direction 35 of the laser beam axis, no overlapping takes place among the discharge columns with the consequence that the dark portions would be formed among the adjacent rows of the discharge columns. While these dark portions do not directly influence on the quality of the laser beam, they would substantially shorten the length of the excitation section (a section contributing to the laser action), whereby the laser output decreases.

By arranging the apertures 25 in a manner to cause the discharge column to be overlapped not only in the direction 35 of the laser beam axis, but also in the direction orthogonally intersecting with the direction of the laser beam axis, as shown in FIG. 12, it becomes possible to prevent the laser output from being lowered, and also to take out the high quality laser beam.

In the above-described fourth and fifth embodiments of the present invention, the discharge columns are made to overlap among themselves by arranging the apertures 25 in the staggered form. It is also feasible that these discharge columns may be overlapped by arranging these apertures 25 at a short distance among them. However, since the expansion of the discharge columns depend considerably on the discharge conditions, the gas pressure, and the gas composition, it might occur from time to time that the dark portions would come out when these conditions change, even if the discharge columns are overlapped under certain conditions. Therefore, by arranging the apertures 25 in the staggered form as mentioned in the foregoing, it is possible to overlap the discharge columns most easily and accurately.

As the apertured electrode 24 having a plurality of apertures 25, there may be used a metal plate or a metal mesh having a thickness of from 1 $\mu$m to 3 mm.

Also, the shape of the aperture 25 is not limited to circle, but also any shape may be adopted provided that the overlapping of the discharge column may be attained with good efficiency.

Figure 13:
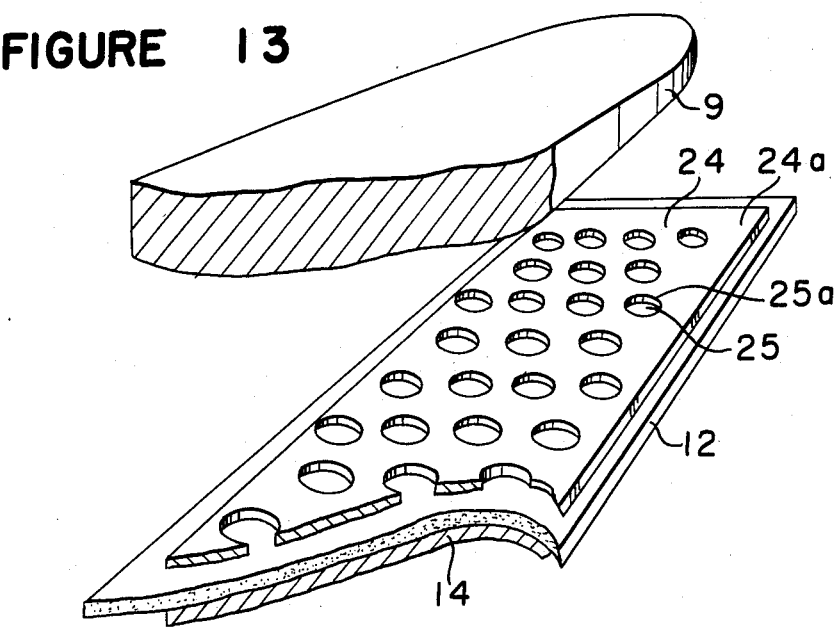
FIG. 13 is a perspective view partly in cross-section showing the electrode section according to the sixth embodiment of the present invention.

FIG. 13 illustrates the sixth embodiment of the present invention. The discharge excitation type short pulse laser device according to this embodiment is in such a construction that the surface of the second main electrode (apertured electrode) 24 opposite to the first main electrode 9 and the side surface 25a of the aperture 25 are joined together by a curved surface. In the drawing, a reference numeral 12 designates the dielectric member, and a numeral 14 refers to the auxiliary electrode.

Figure 14:
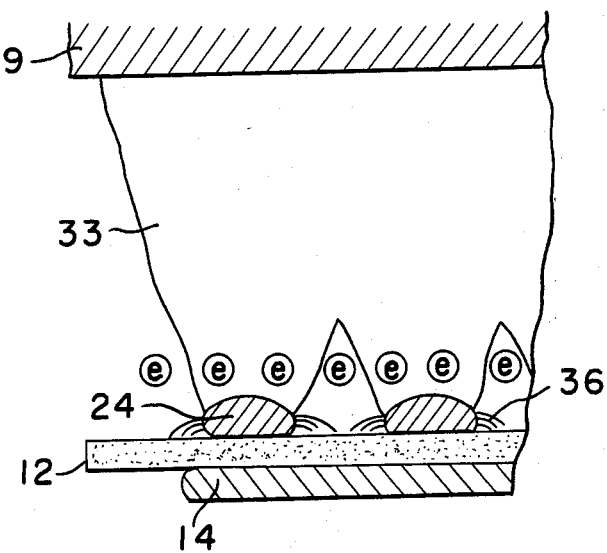
FIG. 14 is an explanatory diagram for the state of the pre-ionization and the main discharge in the electrode section in FIG. 13.

In the sixth embodiment, when a high tension voltage is applied across the first main electrode 9 and the second main electrode 24, avalanche discharge is generated, as shown in FIG. 14, with electrons as the seed for the discharge to thereby form the main discharge 33. At this instant, since the surface 24a of the second main electrode 24 opposing to the first main electrode 9 and the side surface 25a of the aperture are joined through a curved surface (in other words, the angled corner of the aperture 25 is rounded to relax the field intensity), no linear and strong discharge is generated as in the conventional laser device, and a uniform discharge can be obtained easily. As the result of applying the present invention to TEA $CO_2$ laser, there could still obtain the uniform discharge, even when the quantity of helium buffer gas was reduced to 80% to 50% of that used in the conventional laser devices, and the amount of energy to be poured into the creeping discharge 36 was made 1% or less than the energy quantity to be poured in for the main discharge 33, whereby effectiveness of the present invention could be proved.

Figure 15A:
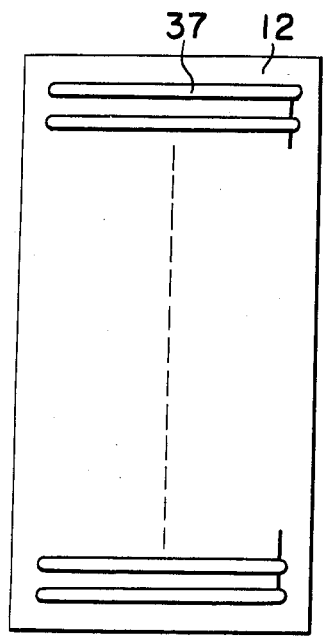
FIG. 15a is a plan view of the second main electrode section according to the seventh embodiment of the present invention as viewed from the main discharge space.
Figure 15B:
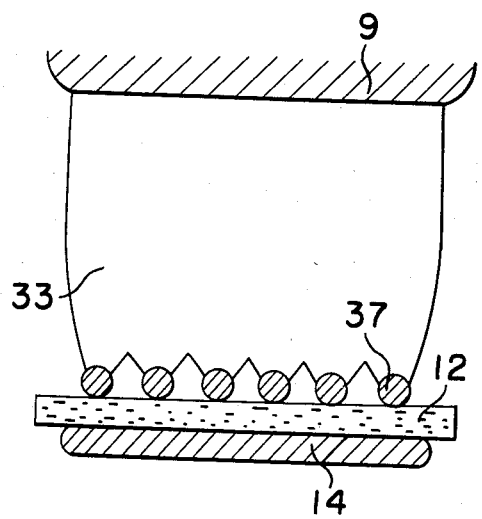

FIG. 15a is a plan view of the main electrode section according to the seventh embodiment of the present invention, when it is seen from the main discharge space; and FIG. 15b is an explanatory diagram showing the relationship between the pre-ionization and the main discharge in the electrode as shown in FIG. 15a.

In the drawing, a reference numeral 37 designates the second main electrode in a rod shape having a circular or elliptical cross-section (hereinafter called "rod-shaped main electrode"), these rod-shaped main electrodes 37 being electrically connected each other. The operations of this main electrode section are same as those of the main electrode sections shown in FIGS. 13 and 14, with further advantage such that this rod-shape main electrode 37 is much easier in its manufacture than the electrodes in any other shapes. Incidentally, an appropriate diameter of this rod-shaped main electrode 37 is in a range of from 0.1 to 3 mm or so. In the embodiment shown in FIG. 14, the shape of the aperture 25 is made circular, but the aperture is not limited to this shape alone, but any other shapes such as ellipses, polygons, and so on may be appropriately adopted. Further, in the above-described embodiments, the second main electrode 24 is shown to be tightly adhered to the dielectric member 12, although a part or whole of the second main electrode 24 may be embedded in the dielectric member 12.

Figure 16:
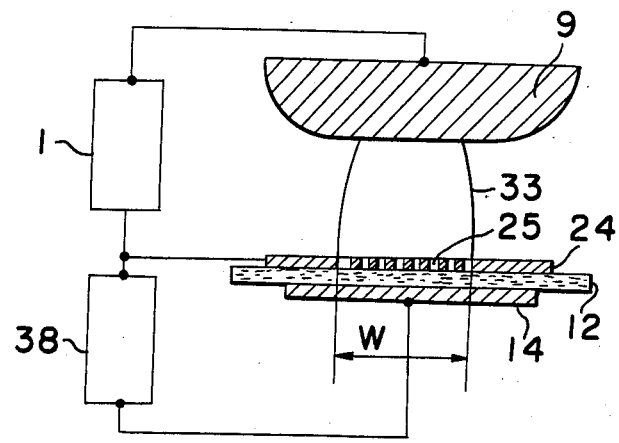
FIG. 16 is a cross-sectional view of the discharge excitation type short pulse laser device according to the eighth embodiment of the present invention.

FIG. 16 shows the eighth embodiment of the discharge excitation type short pulse laser device according to the present invention. This embodiment is to restrict the area of distribution of the apertures in the second main electrode (apertured electrode) and to control the width of the main discharge to be generated, thereby expanding the flat region of the laser beam intensity distribution.

In FIG. 16, the apertures to be formed in the second main electrode 24 are distributed in a region having a narrow breadth W in comparison with that of the first main electrode 9. A reference numeral 38 designates a high tension pulse source. This high tension pulse source 38 may also be formed by use of one part of the high tension pulse source 1 as in the first to seventh embodiments. In the drawing, the same reference numerals as those in the preceding embodiments designate the same constituent parts.

When a high tension voltage is applied across the second main electrode 24 and the auxiliary electrode 14 from the pulse source 38, there occurs an auxiliary discharge (creeping discharge) on the surface of the dielectric member 12 at the portion of the apertures 25 formed in the second main electrode 24. A part of electrons formed by this auxiliary discharge and electrons formed by photo-ionization of ultra-violet rays generated by this auxiliary discharge will become the seed for producing uniform glow discharge. Since the region where the apertures 25 exist in the second main electrode 24 is in the extent of the breadth W, the pre-ionization electrons are present virtually within this extent of the breadth W. By making the above-mentioned breadth W sufficiently narrower than the breadth of the first main electrode 9, it is possible to make the region where the pre-ionization electrons exist narrower than a region where the field intensity on the surface of the first main electrode 9 becomes less than the maximum value by 0.5 to 1% or so.

Figure 18:
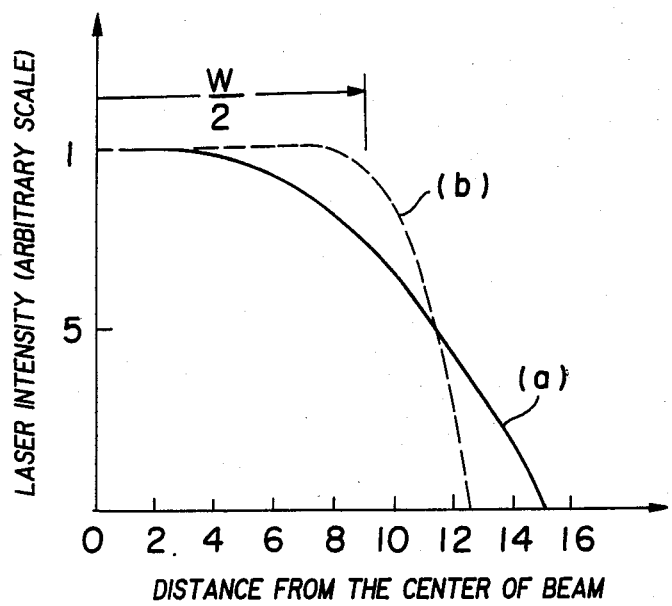
FIG. 18 is a graphical representation showing, in comparison, the laser intensity distribution in the conventional discharge excitation type short pulse laser device and that of the eighth embodiment of the present invention.

In such state, when a pulse voltage is applied across the main electrodes 9 and 24 from the high tension pulse source 1, there is generated the main glow discharge 33 with the above-mentioned pre-ionization electrons as the seed. The width of this main glow discharge 33 is substantially equal to the breadth W of the apertures 25. By this main discharge 33, the laser medium is excited, whereby the laser beam having the breadth W as shown by a dash-line curve in FIG. 18 is obtained. Incidentally, the curve (a) in FIG. 18 indicates the field intensity when the breadth of the aperture portion is not restricted.

Figure 17A:
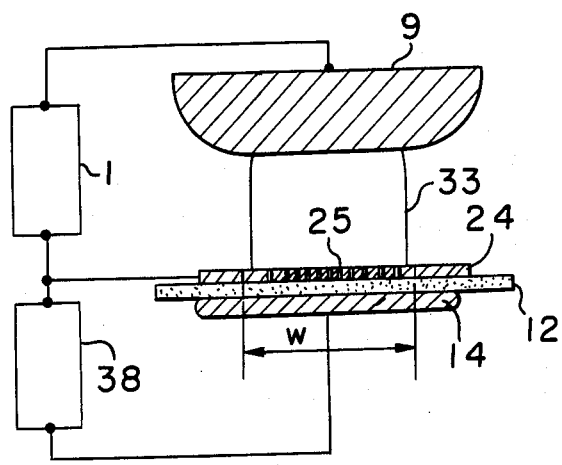
FIG. 17a is a cross-sectional view showing a modified embodiment of FIG. 16.
Figure 17B:
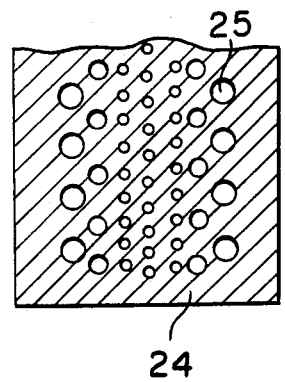

In the above-described embodiment, the diameter of the apertures 25 in the second main electrode 24 is made uniform and constant. However, it may be feasible that, as shown in FIG. 17a and 17b the diameter of the aperture 25 is made larger at the outside than at the inside within the extent of the width W.

Generally speaking, since energy to be made to the auxiliary electrode becomes higher, as the diameter of the aperture becomes larger, the number of the pre-ionization electrons increases in accordance with the amount of energy. Therefore, in the case of FIGS. 17a and 17b, the number of the pre-ionization electrons increases as at the outside of the width W with the consequence that the discharge intensity in the vicinity of the outer periphery of the region increases, whereby expansion of the flat portion in the laser beam intensity distribution is promoted, as represented by the dash-line curve (b) in FIG. 18.

Also, in the above-described embodiment, the discharge region is controlled by restricting the region where the apertures 25 are present. However, the same effect as the above-described embodiment can be obtained even by narrowing the width of the auxiliary electrode 14 per se.

Figure 19:
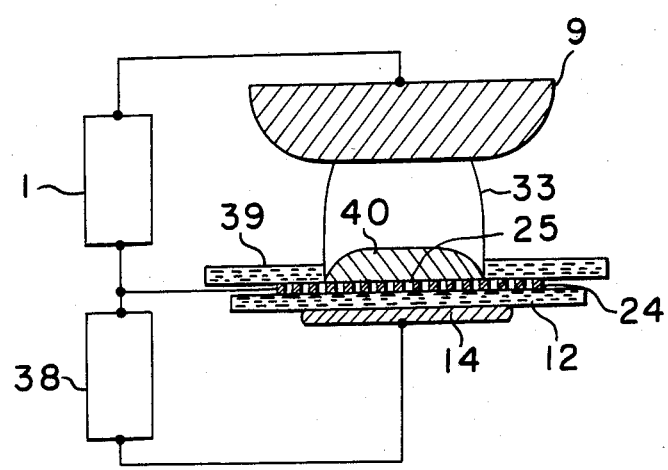
FIG. 19 is a cross-sectional view of the discharge excitation type short pulse laser device according to the ninth embodiment of the present invention.

FIG. 19 illustrates the ninth embodiment of the present invention, which is a modification of the embodiment shown in FIG. 16. In the drawing, the same reference numerals as those in the previous embodiments designate the same component parts. In this embodiment, a part of the second main electrode 24 is covered with an insulating member 39, and the region where the pre-ionization electrons exist, i.e., a distribution region 40, is limited to those regions not covered with the insulating member 39.

Figure 20A:
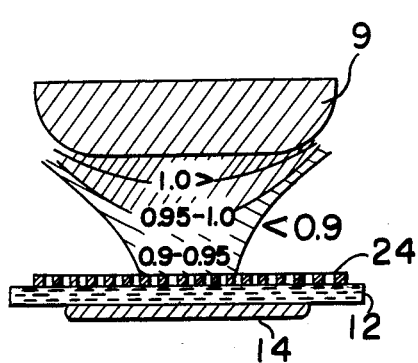
FIG. 20 is a graphical representation showing, in comparison, the field intensity distribution between the conventional discharge excitation type short pulse laser device and that of the ninth embodiment according to the present invention.
Figure 20B:
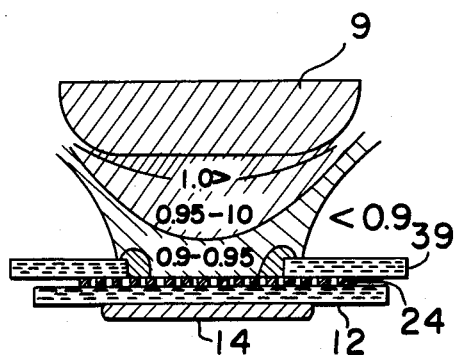
Figure 21:
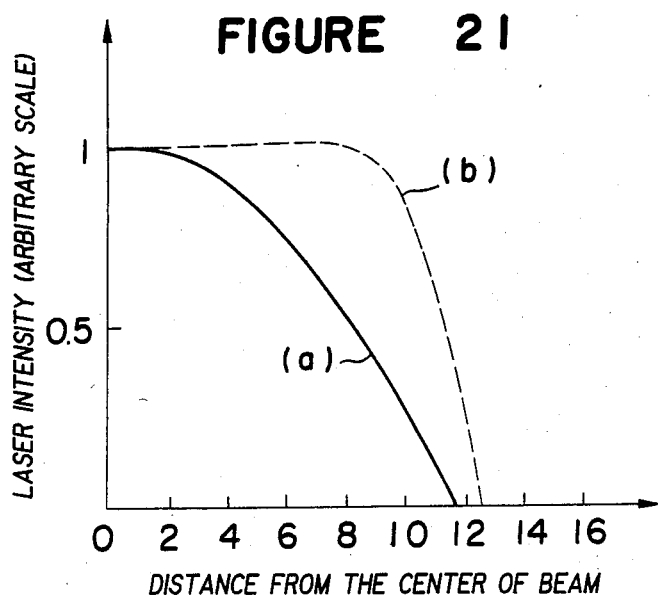
FIG. 21 is a graphical representation showing, in comparison, the field intensity distribution between the conventional discharge excitation type short pulse laser device and that of the ninth embodiment according to the present invention.

FIG. 20 and FIG. 20b illustrate, in comparison, the field intensity distribution (a) produced by the electrodes in the conventional discharge excitation type short pulse laser device and the field intensity distribution (b) produced by the electrodes in the discharge excitation type short pulse laser device according to this ninth embodiment. In the drawing, numerical figures represent the values of the field intensity at each point, when the field intensity at the center part of the surface of the main electrode 24 is set at 1. As is apparent from the illustration, by covering a part of the second main electrode with the insulating member 39 used in this embodiment, there will be produced at the end part of the electrode a portion of increased field intensity with the result that the area of the increased field intensity becomes expanded. Under such circumstances, when a pulse voltage is applied across the first main electrode 9 and the second main electrode 24 from the high tension pulse source 1, the main discharge 33 is generated with the above-mentioned pre-ionization electrons as the seed. This main discharge 33 is produced with a width which substantially reflects the size of the portion of the second main electrode 24 not covered with the insulating member, owing to limitation of the region where the pre-ionization electrons are present as mentioned above and owing to expansion of the portion of increased field intensity. By this main discharge 33, the laser medium is excited to result in the laser beam having a larger width as shown by a dash-line curve (b) in FIG. 21. Incidentally, the solid-line curve (a) in FIG. 21 shows the laser beam intensity when no restriction is imposed on the apertures.

In the following, the tenth embodiment of the present invention will be explained in accordance with FIGS. 22a and 22b.

This tenth embodiment is to solve various problems such that, when the repeating speed is increased for improving the average laser output, the apertured electrode 24 and the dielectric member 12 are subjected to heating to cause local irregularities in the gap length between the main discharge electrodes, or tend to cause the main discharge to be the arc discharge due to damage of the dielectric member 12 and warping of the apertured electrode 24 by thermal stress, or various others.

Figure 22A:
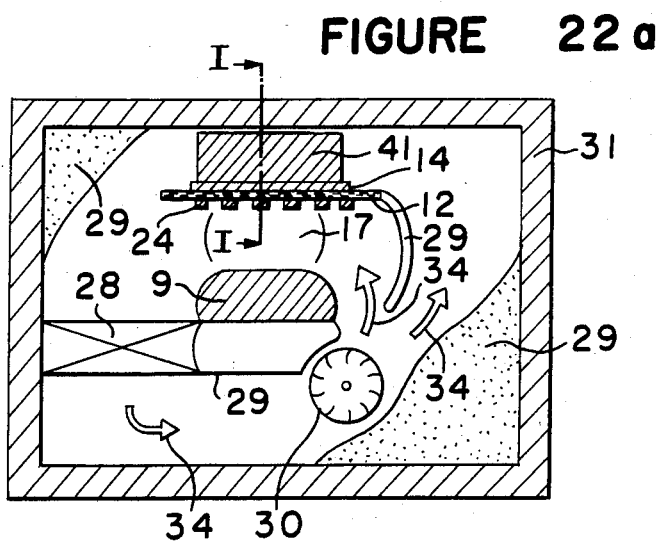
FIG. 22a is a cross sectional view showing the tenth embodiment of the present invention.
Figure 22B:
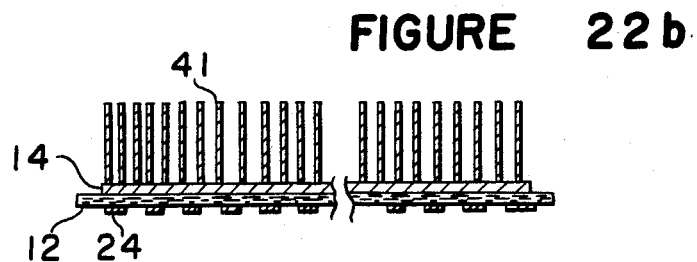
FIG. 22b is a cross-sectional view of the main part of the laser device shown in FIG. 22a, taken along a line I—I.

FIG. 22a is a cross-sectional view showing the pre-discharge section according to the tenth embodiment of the present invention, and FIG. 22b is a cross-sectional view of the main part of the pre-discharge section in FIG. 22a when viewed from the direction I—I. In the drawing, a reference numeral 41 designates radiator fins which, in this embodiment, are provided on the auxiliary electrode 14. However, they may also be provided on the dielectric member 12, or on both auxiliary electrode and dielectric member. In the drawing, those parts identical with those in FIG. 5 are designated by the same reference numerals.

In the following, the function of this pre-discharge section will be described in detail. From the thermal point of view, the apertured electrode 24, the dielectric member 12, and the auxiliary electrode 14 form a three-laminated plate. For instance, when the apertured electrode 24 and the auxiliary electrode 14 are made of nickel, and the dielectric member 12 of alumina, the general value of the heat transfer rate is an order of $10^4$ kcal/m² hr.°C., which is greater by two numerical places than the value of the heat transfer rate from the apertured electrode 24 to helium gas as mentioned above. Accordingly, the rate-determining stage of cooling stands for the heat transfer process to the laser gas (for example, in the excimer laser, 90% and above of the laser gas consists of helium). Therefore, by quickening this heat transfer process, more efficient cooling becomes possible. Moreover, in order to realize this in a simpler method, it is desirable that the laser gas which is circulated at a high speed and controlled its temperature by a heat-exchanger 28 be made the cooling medium for the electrode section. First of all, when the gas flow rate is made n times, the Reynolds number will also become n times with the result that the heat transfer rate becomes approximately n times. On the other hand, however, the pressure loss in the main discharge space 33 would become $n^2$ times (since it is proportionate to the square of the flow rate), which raises a great problem.

Therefore, consideration is given to cooling of the auxiliary electrode 14. As mentioned in the foregoing, since the heat transfer rate among the laminated plates of the apertured electrode 24, the dielectric member 12, and the auxiliary electrode 14 is large, effective cooling of the apertured electrode 24 and the dielectric member 12 can be done satisfactorily by cooling of the auxiliary electrode 14.

For this purpose, heat radiation fins 41 are provided on the auxiliary electrode 14 so as to cause the laser gas to flow through these radiator fins 41.

Assume now that the area of the auxiliary electrode 14 is A, a remainder portion of the electrode area A where no radiator fins 41 are provided is $A_0$, the total area of the radiator fins is $A_f$, and the heat transfer rate on the surface of the fins is $h_0$, the heat transfer coefficient h will be given in the following equation:

$$h = \frac{A_0 + \eta A_f}{A} h_0 \qquad (1)$$

(where: $\eta$ is the so-called fin efficiency, which is a value to be determined by the heat transfer rate at the surface of the fins 41, the heat conductivity of the material constituting the fins 41, thickness of the fins 41, and the height of the fins 41.) As is apparent from the above equation (1), by selecting the shape of the fin so as to make the value $\eta A_f$ large, it is possible to make the value of h extremely large. One example of this will be shown hereinbelow.

Same as the above-mentioned apertured electrode 24, when the width of the auxiliary electrode 14 is taken 0.06 m and the length in the direction of the laser beam axis is taken 0.6 m; onto this auxiliary electrode, 200 radiator fins 41, each having a height of 0.02 m and a thickness of 0.5 mm, are provided at a space interval of 2.5 mm and in the direction orthogonally intersecting with the laser beam axis, the area $A_0$ becomes 0.03 m² and the total area $A_f$ of the fins becomes 0.48 m². Also, when the fins are made of nickel, and the gas flow rate passing through the fins 41 is set at 20 m/sec. the fin efficiency $\eta$ is 0.86 and the heat transfer rate $h_0$ at the fin surface is represented by $2.6 \times 10^2$ kcal/m² hr.°C. (from a literature titled "Den-Netsu Gairon" by Yoshiro Kofuji, published by Yoken-Do, page 27 (1982)). Therefore, the heat transfer rate h will be $3.2 \times 10^3$ kcal/m² hr.°C. from the above equation (1), which is greater than the conventional example by one numerical place.

Figure 23:
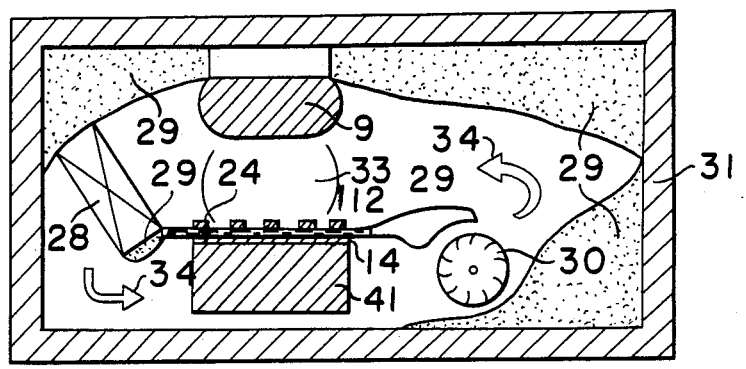
FIG. 23 is a cross-sectional view showing the eleventh embodiment of the present invention.

FIG. 23 illustrates the eleventh embodiment of the present invention. In this embodiment, the main discharge space 33 and the radiator fins 41 are arranged in series in the gas flow path. In the case of both main discharge space and the radiator fins being arranged in parallel as shown in FIG. 22a and 22b, the gas flow rate of the fan 30 should be increased for a quantity corresponding to the gas current passing through the radiator fins 41. In contrast to this, according to this embodiment, the gas flow rate may remain unchanged, while the discharge pressure of the fan 30 should be increased. Which form of embodiment is to be chosen depends rather on the performance of the fan 30.

Figure 24:
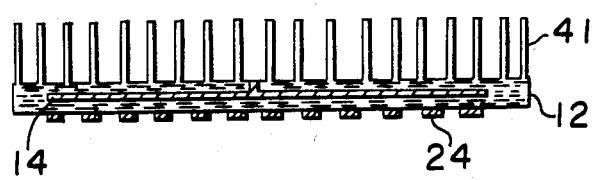
FIG. 24 is a cross-sectional view showing the heat-radiation fins according to the twelfth embodiment of the present invention.

FIG. 24 is a cross-sectional view showing the radiator fin section according to the twelfth embodiment of the present invention. In this embodiment, since the auxiliary electrode 14 is embedded in the interior of the dielectric member 12, the radiator fins 41 are provided on this dielectric member 12. In this case, the radiator fin 41 may be made of the dielectric material or a metal material.

Figure 25:
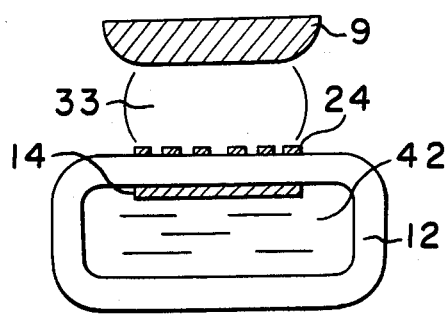
FIG. 25 is a cross-sectional view showing the discharge excitation type short pulse laser device according to the thirteenth embodiment of the present invention.

FIG. 25 illustrates the thirteenth embodiment of the present invention. Same as the embodiments shown in FIGS. 22a, 22b and 24, this embodiment relates to the construction for cooling the electrode section. In the drawing, the same reference numerals designate those component parts identical or similar to those in the previous embodiments.

In FIG. 25, the dielectric member 12 takes a tubular construction. Within this tubular dielectric member, there is disposed the auxiliary electrode 14 and also there is a flow of de-ionized water 42, with which cooling of the auxiliary electrode 14 and the dielectric member 12 is effected, and, through these auxiliary electrode and the dielectric member, cooling of the apertured electrode 24 is also effected.

Since the heat transfer rate between the de-ionized water and the auxiliary electrode 14 is $10^3$ kcal/m$^2$ hr.°C. or above, and the heat transfer rate in the three-layered structure part made up of the auxiliary electrode 14, the dielectric member 12, and the apertured electrode 24 is $10^4$ kcal/m$^2$ hr.°C., as mentioned in the foregoing, it is apparent that the temperature of the three-layered structural part can be maintained substantially equal to the temperature of the di-ionized water, when these two heat transfer rates are compared with the order of the heat input as mentioned in the foregoing.

Figure 26:
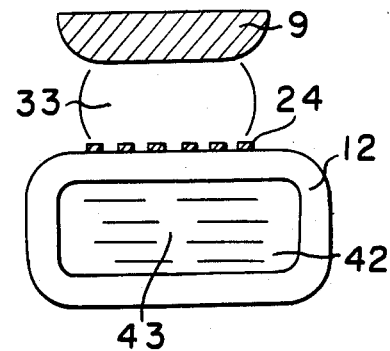
FIG. 26 is a cross-sectional view showing the fourteenth embodiment of the present invention.

FIG. 26 is the fourteenth embodiment of the present invention, wherein a reference numeral 43 designates a feeder line, and the remainder of the reference numerals designate the same parts as in FIG. 25 above. In this embodiment, the auxiliary electrode 14 is eliminated, and, instead, this function of the auxiliary electrode is vested on the de-ionized water 42 per se, besides its function as the cooling medium, and the power supply is effected through the feeder line 43, whereby the auxiliary electrode section is made extremely simple in construction.

Also, as the cooling medium, there may be used, besides the de-ionized water 42, ammonia and halogenated fluorocarbon and so forth.

Further, it is feasible to confine the cooling medium in the tubular dielectric member 12 to form a heat-pipe for carrying out the cooling operation.

As mentioned in the foregoing, according to these embodiments of the present invention, since the dielectric member is constructed in the tubular shape, in which the cooling medium in confined or caused to flow, the apertured electrode and the dielectric member can be cooled with good efficiency. Therefore, with such tubular dielectric member, there can be realized the discharge excitation type short pulse laser device capable of stably operating even at the time of high laser oscillation repetition speed, i.e., even at the time of high average output and high speed repeating laser oscillation.

Figure 27:
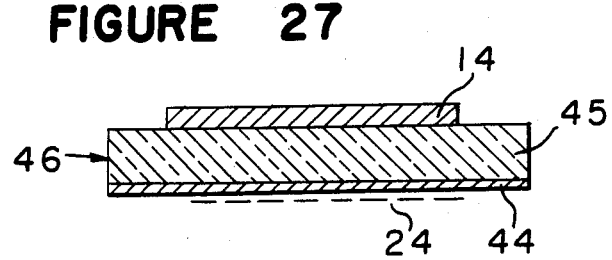
FIG. 27 is a cross-sectional view showing a part of the electrode system of the fifteenth embodiment according to the present invention.

FIG. 27 illustrates the fifteenth embodiment of the present invention, which relates particularly to improvement in the dielectric member. In view of the facts that the conventional laser device is not able to use those dielectric materials having a high specific dielectric constant and those dielectric materials having a high heat conductivity, from the standpoint of reaction of the laser medium, is not able to increase the making power to the creeping discharge for the pre-ionization, or is not able to carry out effective cooling against heating of the dielectric member accompanied by the high repeating laser oscillation, the laser device according to the present invention is so constructed that it is durable against the high repeating laser oscillation by effective cooling of the dielectric member through increase in the making power for the pre-ionization, or obtaining the glow discharge of higher stability, or increase in the heat conductivity of the dielectric member.

In FIG. 27, a reference numeral 44 designates the first dielectric layer provided on the side of the second main electrode 24 and made up of a material inactive to the laser gas, a numeral 45 refers to the second dielectric layer having a thickness greater than the first dielectric layer 44, and a numeral 46 refers to a composite dielectric member composed of the first dielectric layer 44 and the second dielectric layer 45. By the way, a reference numeral 14 designates the auxiliary electrode.

In the following, the function of the dielectric member will be explained in detail. The thickness of the first dielectric layer 44 is taken as $d_a$ and the specific dielectric constant thereof is taken as $\epsilon_a$, while the thickness of the second dielectric layer 45 is taken as $d_b$ and the specific dielectric constant thereof is taken as $\epsilon_b$. Here, as the conditions to be satisfied, (1) $\epsilon_a << \epsilon_b$ and (2) $d_b >> d_a$ are selected. Further, the first dielectric layer 44 is made of a material which is inactive to the chemical reactions in the laser device and does not give mal-effect to the gas laser. Heretofore, the first dielectric layer or the second dielectric layer is used singly, the thickness of which is set at d. The problem to arise when such dielectric layer is used singly is as explained in the foregoing. Now, the specific dielectric constant $\epsilon$ of the dielectric member (hereinafter called "composite dielectric member") according to the present invention is expressed by the following equation:

$$\epsilon = \epsilon_a \epsilon_b (d_a + d_b)/(\epsilon_a d_b + \epsilon_b d_a) \cdots \quad (2).$$

When comparing the magnitude between $\epsilon$ and $\epsilon_a$, $$\epsilon - \epsilon_a = \frac{\epsilon_a \epsilon_b d_a + \epsilon_a \epsilon_b d_b}{\epsilon_a d_b + \epsilon_b d_a} - \frac{\epsilon_a \epsilon_b d_a + \epsilon_a \epsilon_b d_b}{\epsilon_a d_b + \epsilon_b d_a} \quad (3)$$

$$= \frac{(\epsilon_b - \epsilon_a)\epsilon_a d_b}{\epsilon_a d_b + \epsilon_b d_a}.$$

since $\epsilon_a << \epsilon_b$, the equation (3) always takes the positive value, hence it is apparent that $\epsilon > \epsilon_a$. Accordingly, if $d_a + d_b$ is approximately equal to d, it may be concluded that the composite dielectric member is able to make much more power for the pre-ionization on the basis of the following equation (4):

$$W_d \propto \epsilon_s/d \cdots \quad (4)$$

(where: $W_d$ denotes the making power; $\epsilon_s$ represents the specific dielectric constant of the dielectric member; and d refers to thickness of the dielectric member). Moreover, since the surface of the dielectric member to contact with the laser gas is that of the first dielectric layer 44, its characteristic of being inactive to the chemical reactions in the laser is not lost at all. Explaining more concretely, the first dielectric layer 44 is made of, for example, alumina porcelain (having a specific dielectric constant of approximately 10), which is used in a smaller thickness than that (a few millimeters) when it is used singly. For example, if it is used with a thickness of 1/10 of its single use, it is equivalent to ten times as high as the specific dielectric constant of its single use. However, with such small thickness, there will remains a question of the mechanical strength of the first dielectric layer. In order to reinforce this weakness in the mechanical strength of the single first dielectric layer, the second dielectric layer 45 having a high specific dielectric constant such as, for example, barium titanate porcelain (having the specific dielectric constant $\epsilon_s$ of approximately 3,000) and having a thickness to satisfy the mechanical strength is laminated on this first dielectric layer 44 to form the intended composite dielectric member. In this way, the total specific dielectric constant of the composite dielectric member (composed of alumina porcelain and barium titanate porcelain) is higher by approximately ten time than that of the alumina porcelain having the same thickness with the composite dielectric member, when it is used singly, and yet, the characteristic of the alumina porcelain such that it is inactive to the chemical reactions within the casing of the laser device is not lost at all.

The combination of the composite dielectric member is not limited to the combination of alumina porcelain and the barium titanate, but any other combinations may be adopted.

As the second dielectric layer 45, there may be contemplated use of various organic substances having the specific dielectric constant of 20 or more such as, for example, tallium bromide (TlBr), tallium chloride (TlCl), vanadium dioxide (VO$_2$), lead oxide (PbO), titanium porcelain, zirconium titanate, and strontium titanate.

As the first dielectric layer 44, there may be contemplated use of quartz glass, sodium carbonate glass, borosilicate glass, lead glass, diamond, or carbon having the same characteristic as that of diamond and so forth.

While it is feasible to use two dielectric members in lamination, it should be preferable that the two dielectric members be made in a tightly adhered structure by laminating one dielectric member onto the other dielectric member, since an air layer to be formed between the two dielectric members is liable to decrease the dielectric strength of the composite dielectric member.

When borosilicate glass of 0.5 mm thick and barium titanate of 2 mm thick were used to make the composite dielectric member, it was found that the composite dielectric member did not show any arc discharge at the end of the laser oscillation for 10,000 times, and also the number of streamers mixed in the glow discharge remarkably decreased.

The same construction can be applied to increase the heat conductivity of the dielectric member. The point of problem inherent in the conventional laser device concerning the heat conductivity is as already described in the foregoing. When a dielectric material having a low heat conductivity is used as the first dielectric layer 44, and then the second dielectric layer 45 having a higher heat conductivity (1 W cm$^{-1}$ deg$^{-1}$ or above) than that of the first dielectric layer and having a larger thickness than the first dielectric layer 44 is laminated on this first dielectric layer 44, the total heat conductivity of this composite dielectric member becomes higher, whereby heat in the dielectric member 46 can be smoothly diffused and the problem of crack thereof due to heat distortion is solved.

When the dielectric member was made by combination of quartz glass of 0.5 mm thick and beryllia of 2 mm thick, it was found that, even when the repeating speed of the laser oscillation was increased to 400 Hz, no crack as mentioned above was produced. When the repeating speed was increased to 600 Hz, the cracks occurred in the dielectric member. The reason for this cracks is that quartz glass and beryllia were not tightly adhered each other. When the dielectric member is made into more tightly adhered construction, it may be possible that the repeating speed of the laser oscillation can be further increased.

As the first dielectric layer (in this case, a substance having a low heat conductivity, but being inactive to the chemical reactons in the laser), there may be contemplated use of quartz glass and borosilicate glass (having heat conductivity of 0.014 W cm$^{-1}$deg$^{-1}$), sodium carbonate glass, lead glass, and alumina porcelain (having heat conductivity of 0.3 W cm$^{-1}$deg$^{-1}$). On the other hand, as the second dielectric layer (a substance having high heat conductivity), there may be contemplated use of beryllia (BeO) having heat conductivity of 2.1 W cm$^{-1}$deg$^{-1}$, diamond having heat conductivity of 0.9 W cm$^{-1}$deg$^{-1}$, or carbon having the characteristic close to that of diamond. Since diamond of carbon having the characteristic similar to that of diamond possesses its heat conductivity of 9.0 W cm$^{-1}$deg$^{-1}$which is higher than that of metals (for example, copper has its heat conductivity of approximately 4 W cm$^{-1}$deg$^{-1}$) and is inactive to the chemical reactions within the laser, when a film of diamond or carbon having the similar characteristic to that of diamond is coated on the surface of the dielectric material having the high specific dielectric constant as mentioned in the foregoing, there can be obtained the composite dielectric member having the three characteristic points of high specific dielectric constant, good heat conductivity, and inactiveness to the chemical reactions in the laser. It may be added to say that, since diamond is used in the form of a thin film, it is desirable from the standpoint of the manufacturing cost.

Figure 28:
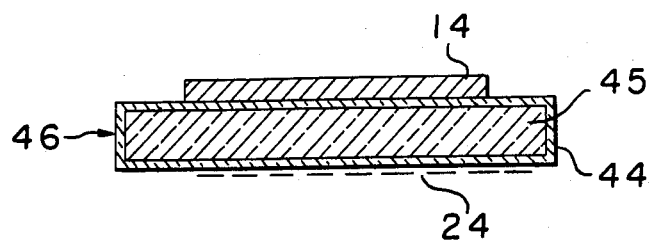
FIG. 28 is a cross-sectional view showing a part of the electrode system of the modified embodiment according to the present invention.

Furthermore, FIG. 27 shows a construction wherein two layers are directly laminated one on the other. It should however be noted that there may be employed a construction as shown in FIG. 28, wherein the first dielectric layer 44 surround the outer peripheral surface of the second dielectric layer 45.

It is further possible that each of the first dielectric layer and the second dielectric layer is the composite dielectric member composed of a plurality of dielectric materials.

Figure 29:
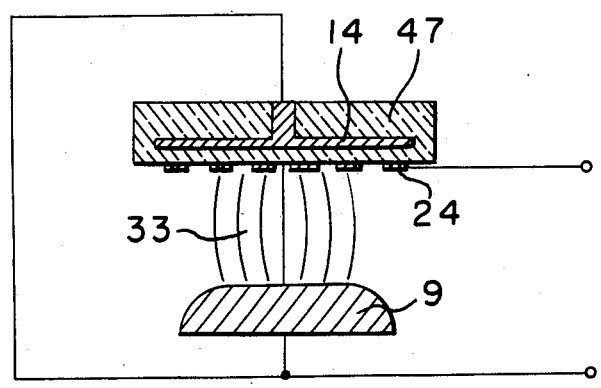
FIG. 29 is a cross-sectional view of the electrode section according to the sixteenth embodiment of the present invention.

FIG. 29 illustrates the sixteenth embodiment of the present invention, which is concerned with the dielectric member to be suitably used for the discharge excitation type short pulse laser device, in which halogen gas is used as the laser gas.

In FIG. 29, a reference numeral 47 designates the dielectric member of alumina porcelain which has been formed in such a manner as to surround the auxiliary electrode 14. In the drawing, the same reference numerals designate the same component parts as in the previous embodiment, and the explanations thereof will be dispersed with.

The thickness of the dielectric member 47 to be held between the auxiliary electrode 14 and the second main discharge electrode 24 is 8 mm in the case of using quartz glass. It has however been verified that, when the alumina porcelain of 99% purity is used, favorable insulating characteristic could be obtained with the dielectric member over a long period of time even when its length is shortened to 2 mm. Moreover, when a voltage to be applied across the electrodes 14 and 24 is the same, it is observed that the alumina porcelain having thin thickness produces strong light intensity of the auxiliary discharge to be generated at the perforated portion in the second main discharge electrode 24.

According to this sixteenth embodiment of the present invention, use is made of alumina porcelain having extremely high dielectric strength, high specific dielectric constant, and containing as the principal component thereof alumina which is inactive to halogen gas. Therefore, the dielectric member according to this embodiment has remarkable effects such that it can obtain the auxiliary discharge sufficient for generating uniform main discharge, it can operate with high reliability without bringing about the dielectric deterioration over a long period of time, and yet it can extend the service life of the laser gas.

What is claimed as new and desired to be secured by Letters Patent of the United States is:

1. A discharge excitation type short pulse laser device comprising first and second main electrodes disposed in mutual confrontation, with the direction of the laser beam axis as their longitudinal direction; an auxiliary electrode provided on the rear surface part of said second main electrode and opposed to said second main electrode through a dielectric member; a pulse circuit for applying a pulse voltage across said first and second main electrodes; and a circuit for applying a voltage across said auxiliary electrode and said second main electrode, characterized in that said second main electrode is made of an electrically conductive material having a plurality of apertures therein, that said second main electrode and said dielectric member are disposed in tight adhesion to each other, and that said second main electrode is thinly formed to enable creeping discharge to be produced on the surface of said dielectric member, thereby distributing electrons to be the seed for the main discharge to be generated across said main electrode.

2. A discharge excitation type short pulse laser device according to claim 1, wherein a perforated metal plate having a thickness of from 1 μm to 3 mm is used as said second main electrode.

3. A discharge excitation type short pulse laser device according to claim 1, wherein a metal mesh having a thickness of from 1 μm to 3 mm is used as said second main electrode.

4. A discharge excitation type short pulse laser device according to claim 1, wherein said second main electrode is an electrically conductive film formed on said dielectric member.

5. A discharge excitation type short pulse laser device according to claim 1, wherein said second main electrode and said dielectric member are made in a convex shape towards the first main electrode so as to gradually relax the electric field in the vicinity of the surface of said second main electrode as it is away from the center part of said second electrode.

6. A discharge excitation type short pulse laser device according to claim 1, wherein said auxiliary electrode is tightly adhered onto the surface of said dielectric member opposite to the surface where said second main electrode is tightly adhered, or it is embedded in the interior of said dielectric member.

7. A discharge excitation type short pulse laser device according to claim 1, wherein said plurality of apertures are set at their respective positions so that, when arbitrary imaginary lines parallel to the laser beam axis are set at a portion where at least the laser beam passes, out of the space held between said first and second main discharge electrodes, said imaginary lines pass, without failure, through a plurality of main discharge columns.

8. A discharge excitation type short pulse laser device according to claim 7, wherein said plurality of apertures are set at their respective positions so that the main discharge columns to be generated in juxtaposition from the apertures of one of said main electrodes or from the neighborhood of said apertures may be overlapped each other.

9. A discharge excitation type short pulse laser device according to claim 7, wherein said apertures are set at their positions so that, when arbitrary imaginary lines parallel to the laser beam axis are provided on the surface of one of said main discharge electrodes having a plurality of apertures, the imaginary lines may pass through said plurality of apertures.

10. A discharge excitation type short pulse laser device according to claim 7, wherein said apertures are set at their positions so that, when arbitrary imaginary lines parallel to the laser beam axis and arbitrary imaginary lines orthogonally intersecting with said laser beam axis are provided on the surface of one of said main discharge electrodes having a plurality of apertures, either of said imaginary lines may pass through said plurality of apertures.

11. A discharge excitation type short pulse laser device according to claim 1, wherein the surface of said second main electrode opposite to said first main electrode and the side surface of each of said apertures are joined together by a curved surface.

12. A discharge excitation type short pulse laser device according to claim 1, wherein a plurality of said second main electrodes are disposed in confrontation to said first main electrode, each of said second main electrodes being in a rod shape and having a circular or elliptical cross-section.

13. A discharge excitation type short pulse laser device according to claim 1, wherein said second main electrode with its region where said apertures exist being restricted is used as the means for restricting a region where pre-ionization is effected between said second main electrode and said auxiliary electrode.

14. A discharge excitation type short pulse laser device according to claim 1, wherein, as the means for restricting a region where the pre-ionization is carried out, use is made of said second main electrode, in which the region containing therein said apertures is restricted, and the diameter of said apertures becomes larger as they are away from the center part of said region.

15. A discharge excitation type short pulse laser device according to claim 1, wherein a part of the surface of said second main electrode opposite to said first main electrode is covered with an insulating member.

16. A discharge excitation type short pulse laser device according to claim 1, wherein at least one of said dielectric member and said auxiliary electrode is provided with radiator fins.

17. A discharge excitation type short pulse laser device according to claim 1, wherein said dielectric member is made in a tubular structure, in the interior of which said auxiliary electrode is directly attached onto the surface opposite to the surface where said second main electrode is directly attached, and a cooling medium is confined in the tubular structure or it is caused to flow therethrough.

18. A discharge excitation type short pulse laser device according to claim 17, wherein de-ionized water is used as the cooling medium.

19. A discharge excitation type short pulse laser device according to claim 17, wherein de-ionized water is used as the cooling medium and also as the auxiliary electrode, thereby eliminating said auxiliary electrode.

20. A discharge excitation type short pulse laser device according to claim 1, wherein said dielectric member is provided to the side of said second main electrode, said dielectric member being a composite dielectric member composed of a first dielectric layer made of a material inactive to laser gas and a second dielectric layer having a thickness larger than that of said first dielectric layer.

21. A discharge excitation type short pulse laser device according to claim 20, wherein said second dielectric layer has its specific dielectric constant of 20 or more.

22. The discharge excitation type short pulse laser device according to claim 1, wherein said dielectric member is made of alumina porcelain containing alumina as its principal constituent.

* * * * *